(12) United States Patent
Knispel

(10) Patent No.: US 8,757,229 B2
(45) Date of Patent: Jun. 24, 2014

(54) WINTER TIRE CENTER TREAD PATTERN

(75) Inventor: Oliver Knispel, Gelnhausen-Hailer (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 875 days.

(21) Appl. No.: 12/915,096

(22) Filed: Oct. 29, 2010

(65) Prior Publication Data

US 2012/0103493 A1 May 3, 2012

(51) Int. Cl.
*B60C 11/11* (2006.01)
*B60C 11/03* (2006.01)
*B60C 11/12* (2006.01)

(52) U.S. Cl.
CPC ..... *B60C 11/0302* (2013.04); *B60C 2011/1245* (2013.04); *B60C 2011/0369* (2013.04); *B60C 11/11* (2013.01); *B60C 11/12* (2013.01); *B60C 2011/133* (2013.04); *Y10S 152/03* (2013.01)
USPC ............ 152/209.18; 152/209.22; 152/209.28; 152/DIG. 3

(58) Field of Classification Search
USPC ............... D12/559–567; 152/209.18, 209.22, 152/209.28, DIG. 3
See application file for complete search history.

(56) References Cited

U.S. PATENT DOCUMENTS

| | | | |
|---|---|---|---|
| 4,574,856 A | 3/1986 | Graas | 152/209 |
| 5,370,168 A * | 12/1994 | Boiocchi et al. | 152/209.28 |
| 5,435,366 A * | 7/1995 | Voigt et al. | 152/209.28 |
| 5,725,700 A * | 3/1998 | Ichiki | 152/209.28 |
| 6,415,835 B1 * | 7/2002 | Heinen | 152/209.22 |
| D595,640 S * | 7/2009 | de Briey-Terlinden | D12/564 |
| D635,912 S * | 4/2011 | Knispel | D12/564 |
| D638,350 S * | 5/2011 | Knispel | D12/564 |
| 2002/0139462 A1 * | 10/2002 | Hanebuth et al. | 152/209.28 |
| 2006/0151078 A1 | 7/2006 | Colombo et al. | 152/209.8 |
| 2007/0215258 A1 * | 9/2007 | Fukunaga | 152/209.18 |

FOREIGN PATENT DOCUMENTS

| | | | | | |
|---|---|---|---|---|---|
| EP | 722851 A1 | * | 7/1996 | | |
| JP | 06-127218 A | * | 5/1994 | | |
| JP | 6127218 | | 5/1994 | | B60C 11/04 |

(Continued)

OTHER PUBLICATIONS

Machine translation for Japan 09-226327 (no date).*

(Continued)

*Primary Examiner* — Steven D Maki
(74) *Attorney, Agent, or Firm* — Richard B. O'Planick

(57) ABSTRACT

A vehicle wheel tire center tread region has a repeating circumferential array of first substantially V-shaped grooves positioned on the centerplane, each first V-shaped groove having divergent first groove side arms extending in a first circumferential direction, and a repeating circumferential array of second substantially V-shaped grooves positioned on the centerplane and having divergent second groove side arms extending in a second circumferential direction opposite to the first circumferential direction. Each first V-shaped groove is overlapped by multiple oppositely directed second V-shaped grooves. The first V-shaped groove arms have a varying lengthwise depth that varies between about 2 and 7 millimeters from a shallower depth proximate to a vertex arm region to an increased depth at a medial arm region to a decreased depth at a terminal arm region. The first V-shaped groove arms further vary in width as well as depth from a narrower vertex arm region to a wider medial arm region to a narrow terminal arm region so that the volume of the groove arms per length unit is substantially constant in the medial arm region.

16 Claims, 11 Drawing Sheets

(56) References Cited

FOREIGN PATENT DOCUMENTS

| | | | | |
|---|---|---|---|---|
| JP | 09-207522 A | * | 8/1997 | |
| JP | 09-226323 A | * | 9/1997 | |
| JP | 09-226327 A | * | 9/1997 | |
| RU | 23361281 | | 10/2008 | .............. B60C 11/03 |

OTHER PUBLICATIONS

Machine translation for Japan 09-226323 (no date).*
Machine translation for Japan 09-207522 (no date).*
Machine translation for Japan 06-127218 (no date).*
European Search Report completed Feb. 14, 2012.

* cited by examiner

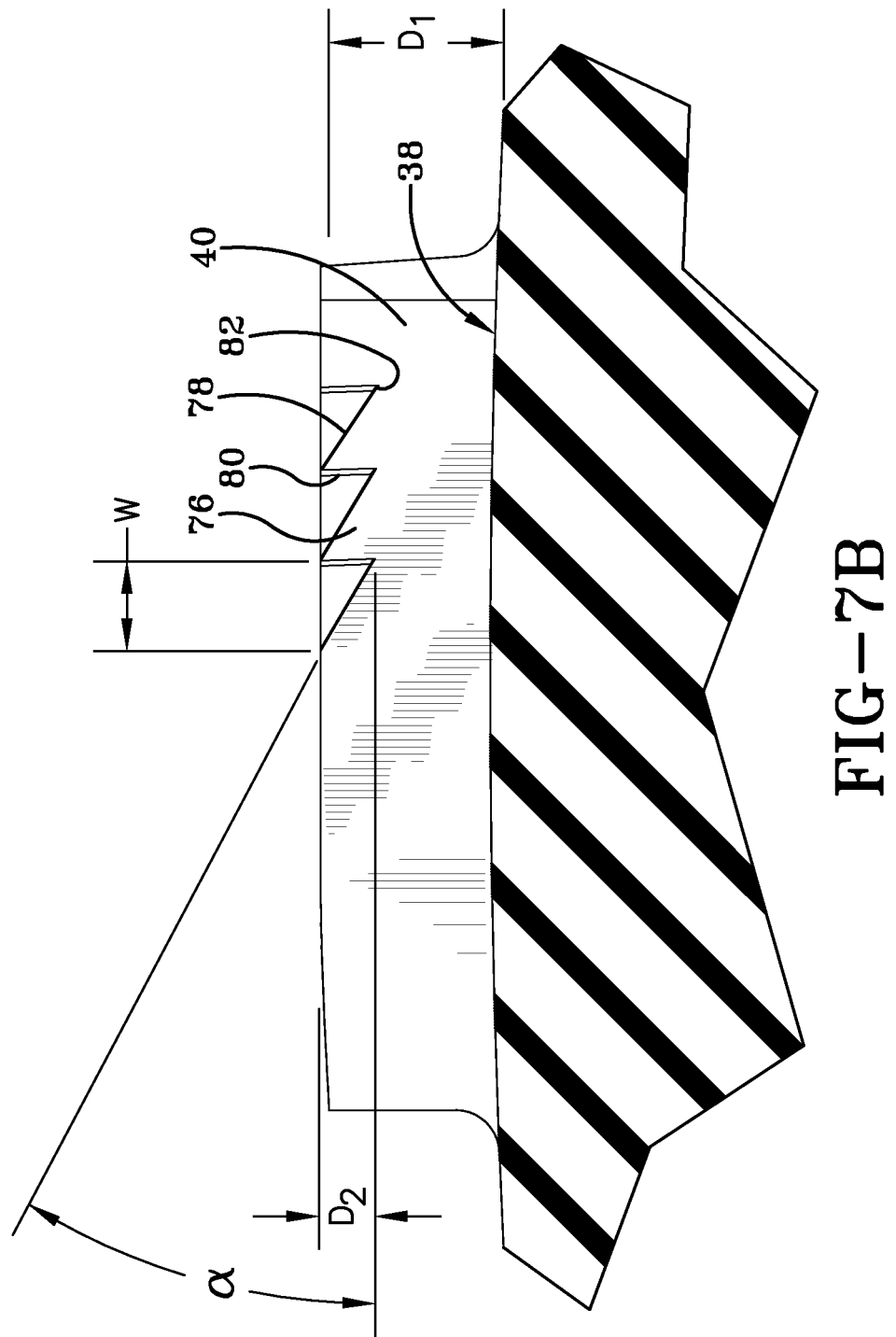

WINTER TIRE CENTER TREAD PATTERN

FIELD OF THE INVENTION

The invention relates generally to vehicle tires and, more specifically, to a center tread pattern for tires of a winter type.

BACKGROUND OF THE INVENTION

Winter tires constructed for winter driving conditions are intended to be suitable for running on surfaces of reduced compactness such as snow-covered roadways. Such tires are required to demonstrate suitable traction (gripping), power, braking, and handling characteristics while demonstrating good dry road, wear, and noise level performance. The tread pattern of winter tires must meet such competing objectives in order to provide the user with acceptable tire performance.

SUMMARY OF THE INVENTION

According to an aspect of the invention, a vehicle wheel tire includes a tire tread having a circumferential center tread region in which block elements are arranged in a pattern on opposite sides of a tire circumferential equatorial centerplane. The tread has a repeating circumferential array of first substantially V-shaped grooves positioned on the centerplane, each first V-shaped groove having divergent first groove side arms extending in a first circumferential direction, and the tread having a repeating circumferential array of second substantially V-shaped grooves positioned on the centerplane and having divergent second groove side arms extending in a second circumferential direction opposite to the first circumferential direction. Each first V-shaped groove is overlapped by a plurality of the oppositely directed second V-shaped grooves. In another aspect, the first V-shaped groove arms have a varying lengthwise depth that varies between about 2 and 7 millimeters from a shallower depth proximate to a vertex arm region to an increased depth at a medial arm region to a decreased depth at a terminal arm region.

In a further aspect, the first V-shaped groove arms vary in width from a narrower vertex arm region to a wider medial arm region to a narrow terminal arm region. The varying depth and width of the first V-shaped groove arms from the vertex region to the terminal region make the volume of the groove arms per length unit is substantially constant in the medial arm region.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 7B is a partial section view of a tread portion taken along the line 7B-7B of FIG. 4.

DETAILED DESCRIPTION OF THE INVENTION

Figure 1:
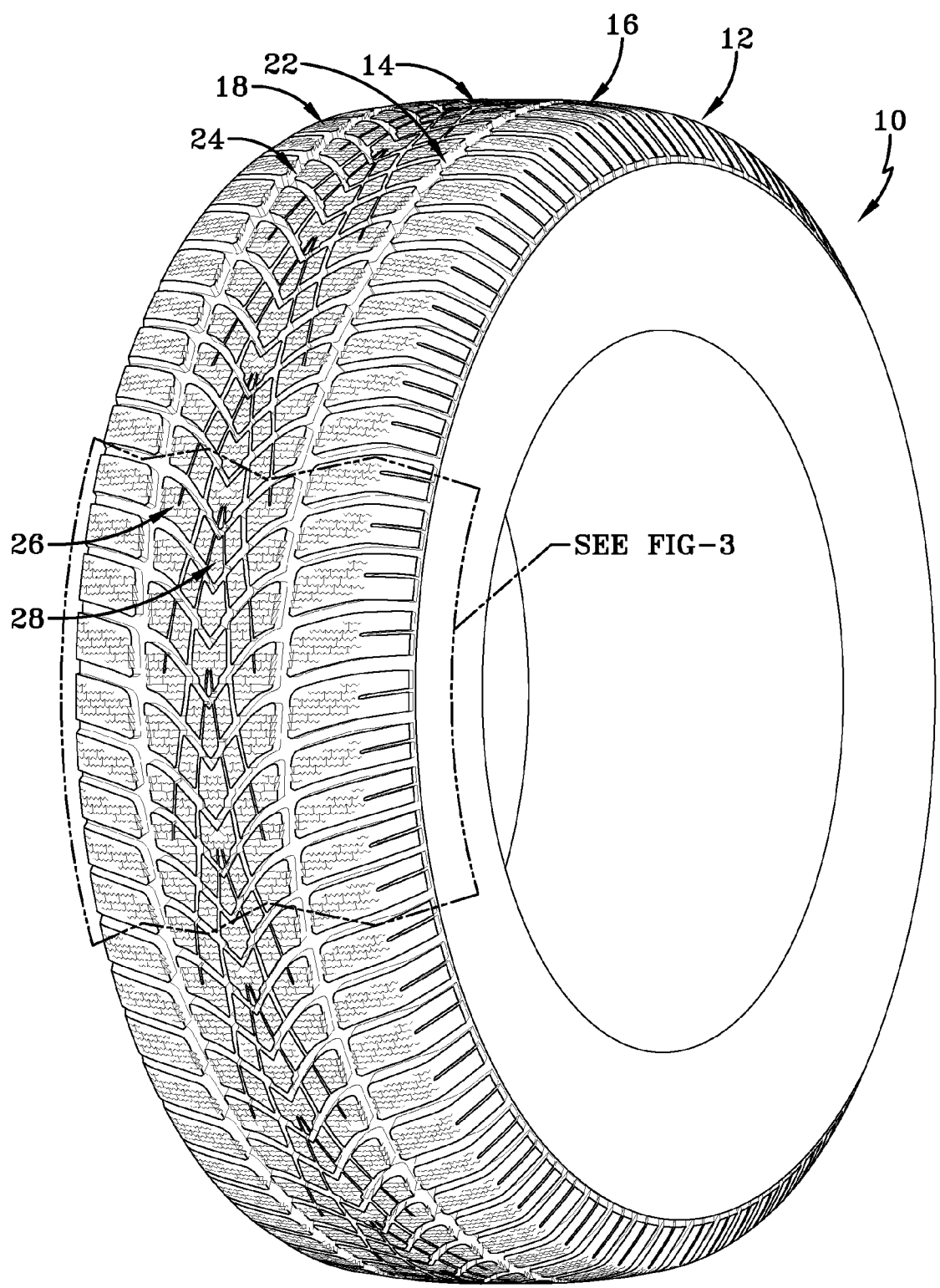
FIG. 1 is a isometric view of a tire including a tire tread.
Figure 2:
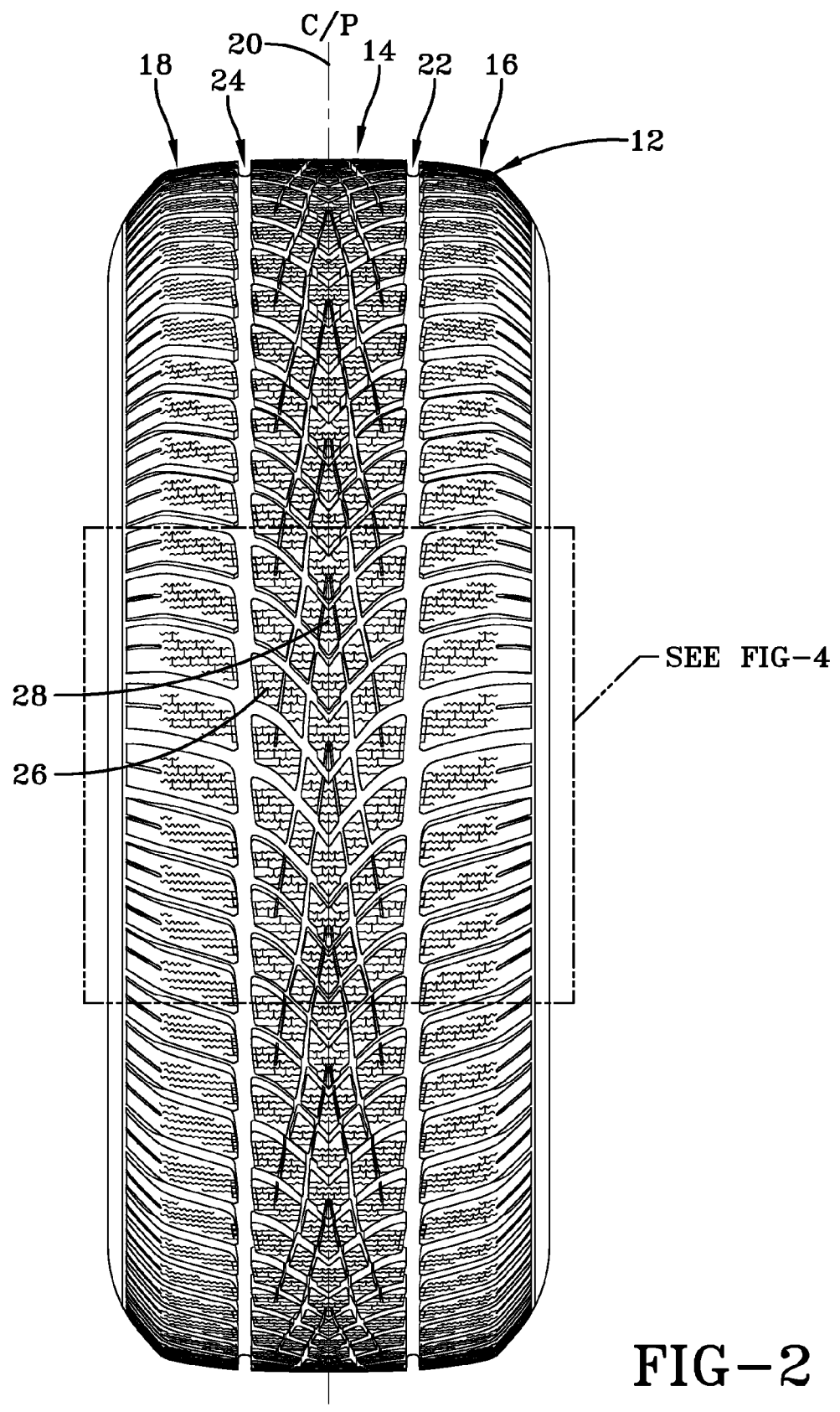
FIG. 2 is a plan view of the tire tread.
Figure 3:
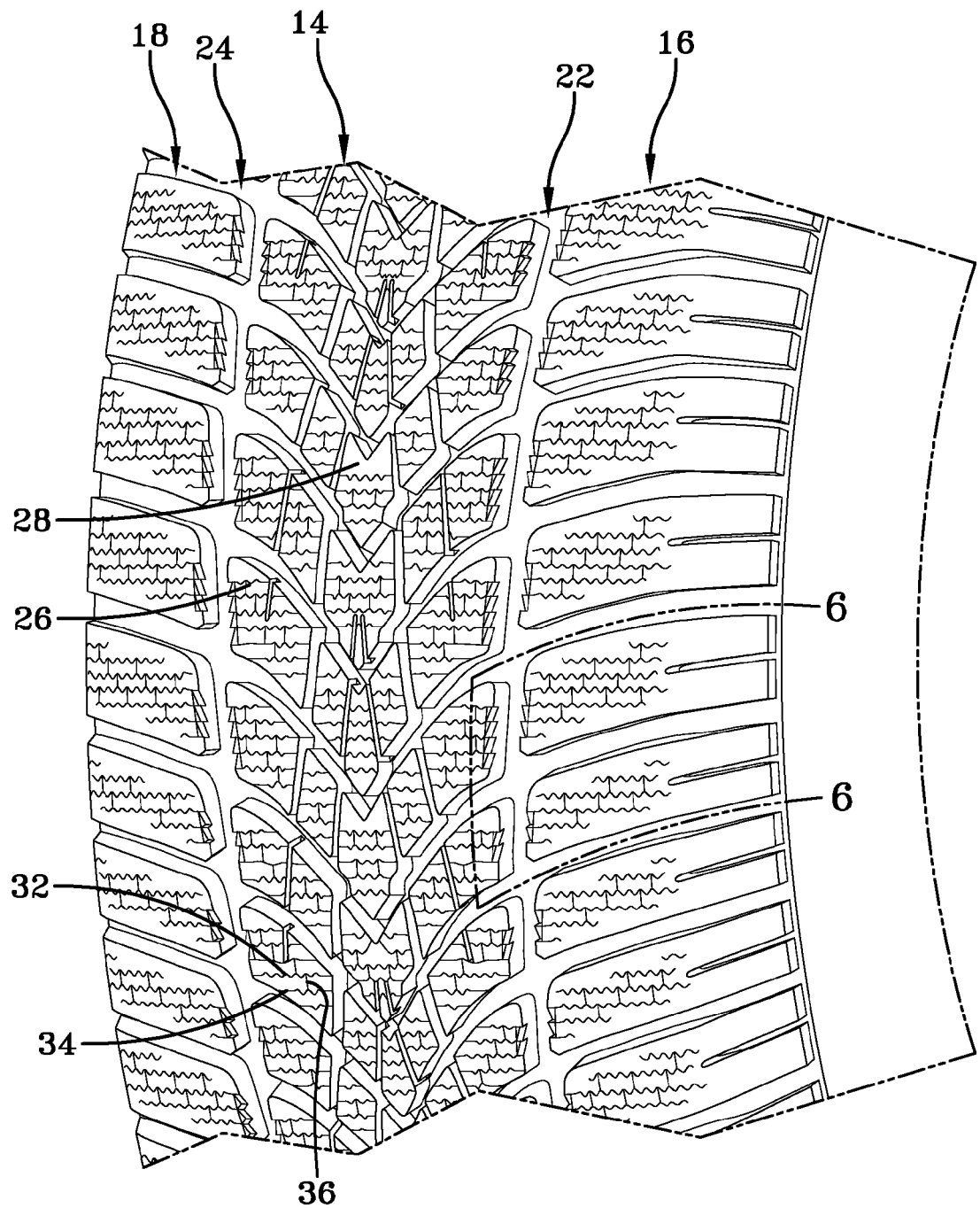
FIG. 3 is an enlarged isometric view of a tread portion identified in FIG. 1.
Figure 4:
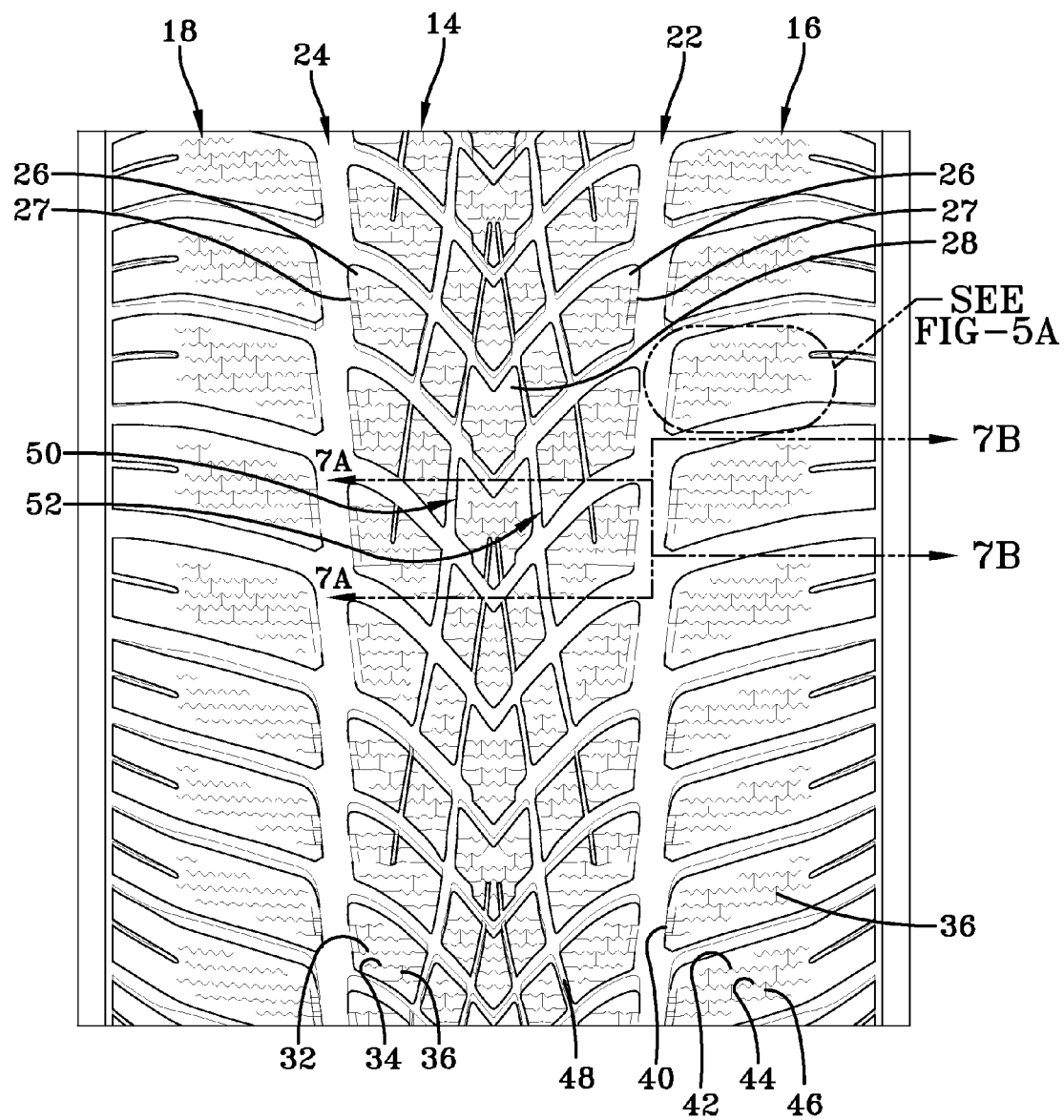
FIG. 4 is an enlarged isometric view of a tread portion identified in FIG. 2.

With initial reference to FIGS. 1, 2, 3, and 4, a tire 10 is provided having a circumferential tread 12. The tread 12 includes a circumferential center tread region 14 and two shoulder tread regions 16, 18 on opposite sides of center region 14. A tire equatorial centerplane 20 divides the tread 12 into two symmetrical halves. A pair of circumferential grooves 22, 24 bound the center tread region 14, separating the center region from opposite shoulder tread regions 16, 18.

Figure 5A:
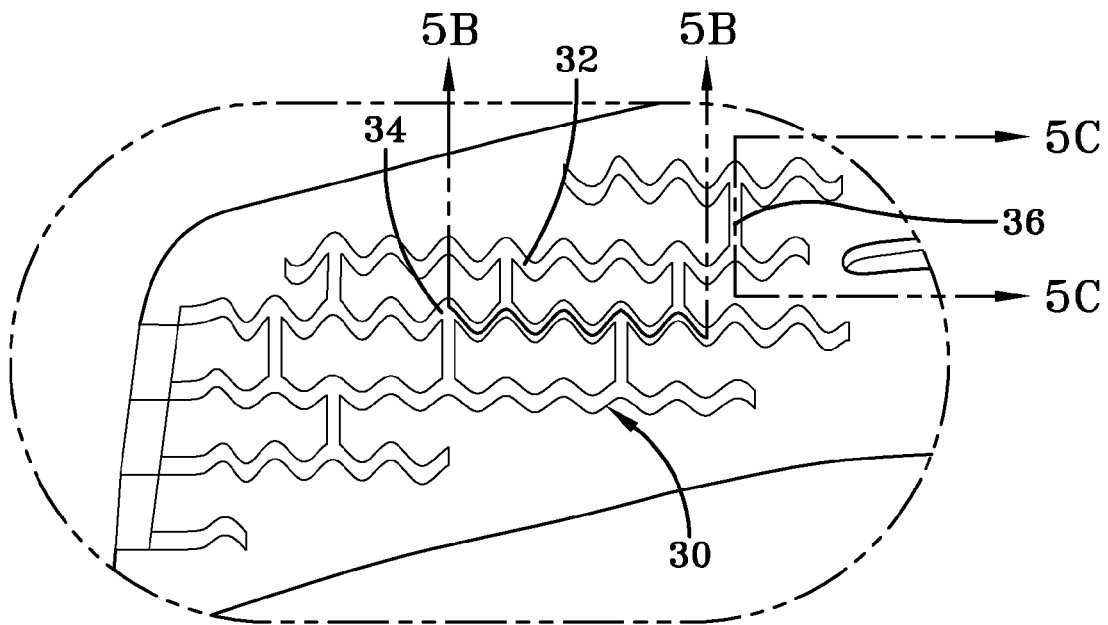
FIG. 5A is an enlarged view of the siping and notch pattern in center tread blocks.

In the symmetrical pattern of the tread 12 shown, the center region 14 includes off-center block elements 26 of sundry geometric shape on opposite sides of the centerplane 20, outer off-center block elements 26 having a groove-facing side 27 that borders a respective circumferential groove 22 or 24. The center region 14 further includes interior on-center block elements 28 of sundry geometric configuration located generally on the circumferential centerplane 20. Some or all of the center region block elements, including selective on-center blocks 28 and off-center blocks 26, include multiple sinusoidal or wavy sipes 30 that run in a mutually spaced apart and parallel orientation laterally across a respective block element. Sipes 30 are generally of a wavy, undulating, or sinusoidal configuration having a variable depth in the lengthwise direction that varies from deeper recessed sipe portions to sipe portions that are not recessed as will be explained below. Adjacent pairs of laterally extending wavy sipes 32, referred for illustration generally as sipes 32, 34, are interconnected by one or more circumferentially extending notches 36. The notches 36 are generally of linear straight-side constant depth configuration, extending circumferentially to interconnect a pair of adjacent wavy sipes at a medial sipe intersection location as shown in FIG. 5.

The shoulder tread regions 16, 18 are formed by block elements 38 having an axially inward facing side 40 adjoining a respective circumferential tread groove 22, 24. The shoulder block elements 38 may at the user's election include multiple sinusoidal or wavy sipes 42, 44 configured similarly to the sipes 30 of the center region 14. The shoulder sipes 42, 44 likewise run in a mutually spaced apart and parallel orientation laterally across a respective shoulder block element and have a variable depth in the lengthwise direction that varies from deeper recessed sipe portions to sipe portions that are not recessed. The adjacent wavy sipes 42, 44 are interconnected by one or more circumferentially extending notches 46. The notches 46 are generally of linear straight-side constant depth configuration, extending circumferentially to interconnect a pair of adjacent wavy sipes at a medial sipe intersection location.

Figure 8:
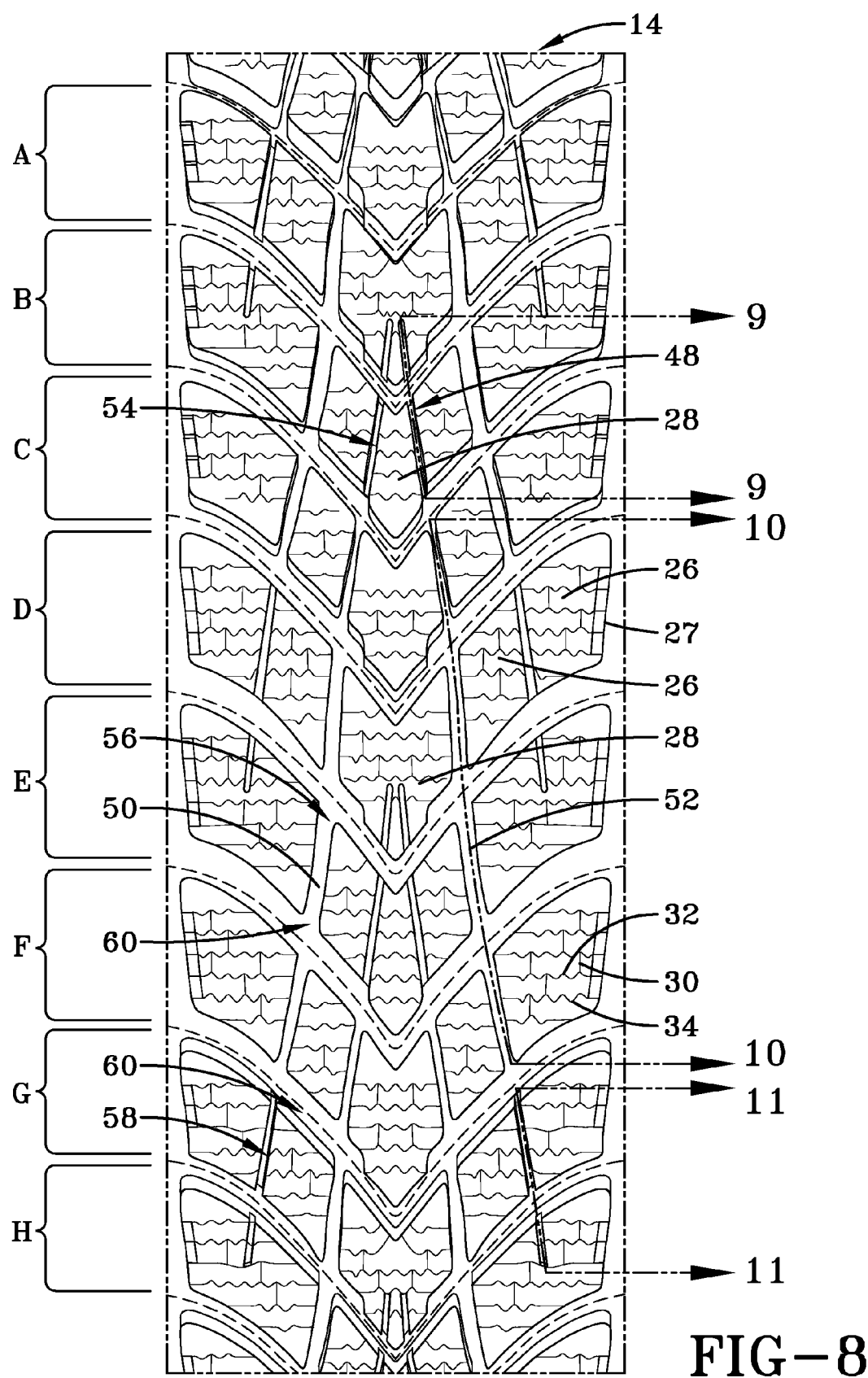
FIG. 8 is a plan view of a portion of the tread center region.

Referring to FIGS. 4, 8, 9, 10, and 11, a circumferential array of spaced apart first V-grooves on the tread centerplane 20. Each of the first V-grooves includes divergent first groove arm 50 and second groove arm 52. Each of the groove arms 50, 52 have a vertex segment 54, a medial segment 56, and a terminal segment 58. The groove arms 50, 52 are of variable width and depth from the vertex segment 54 to the medial segment 56, to the terminal segment 58. The depth of the groove arms 50, 52 are shallowest at the segments 54, 58 and deepest at the medial segment 56. The width of the groove arms 50, 52 is narrowest at the segments 54, 58 and widest at the medial segment. The ends of the groove arms 50, 52 converge but do not meet in the vertex region of each arm as shown in FIG. 8.

Figure 10:
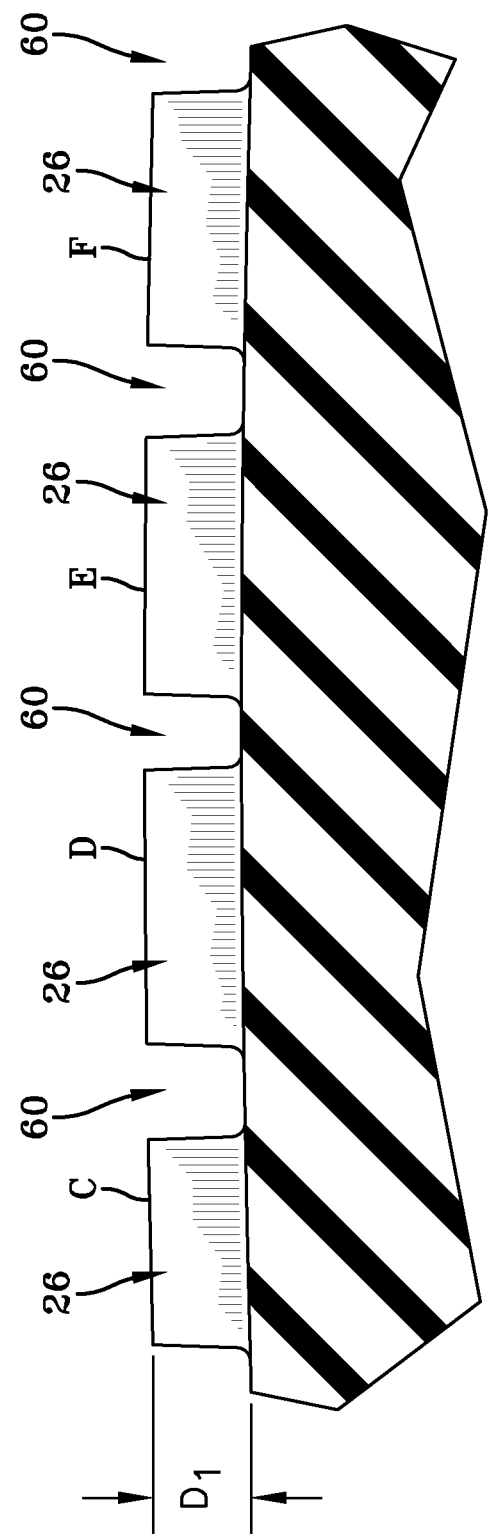
FIG. 10 is a partial section view through the tread center region taken along the line 10-10 of FIG. 8.

A circumferential array of spaced apart second, smaller dimensioned, V-grooves 60 extend about the tread center region symmetric with the centerplane 20. Each of the second V-grooves 60 within the array is oriented in an opposite circumferential direction from the array of first V-grooves 48 on the tread centerplane 20. Each of the second V-grooves 60 include divergent groove legs extending from a vertex segment and each groove 60 is generally semi-circular in section and preferably at a constant depth along the groove. FIG. 10 illustrates in section the configuration of second V-grooves 60 within regions C, D, E, F as those regions are identified in FIG. 8.

Figure 9:
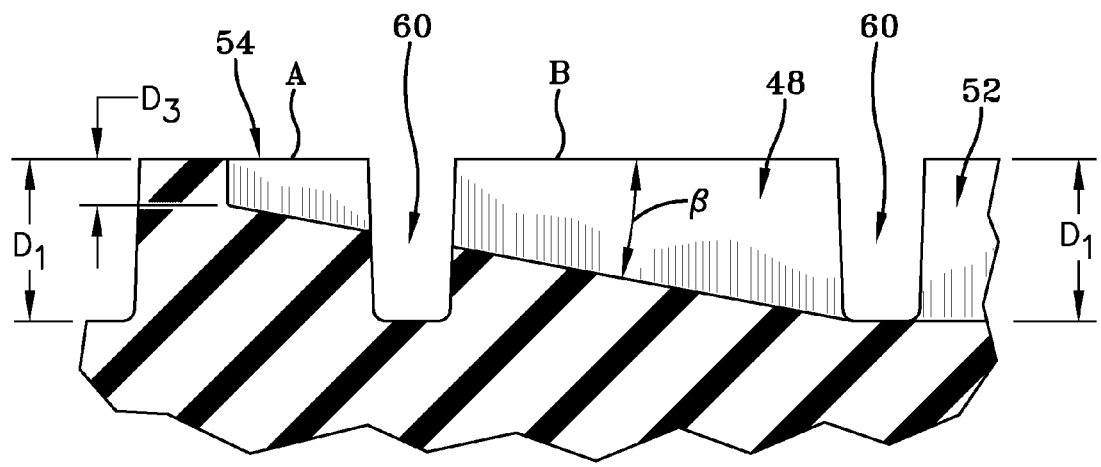
FIG. 9 is a partial section view through the tread center region taken along the line 9-9 of FIG. 8.
Figure 11:
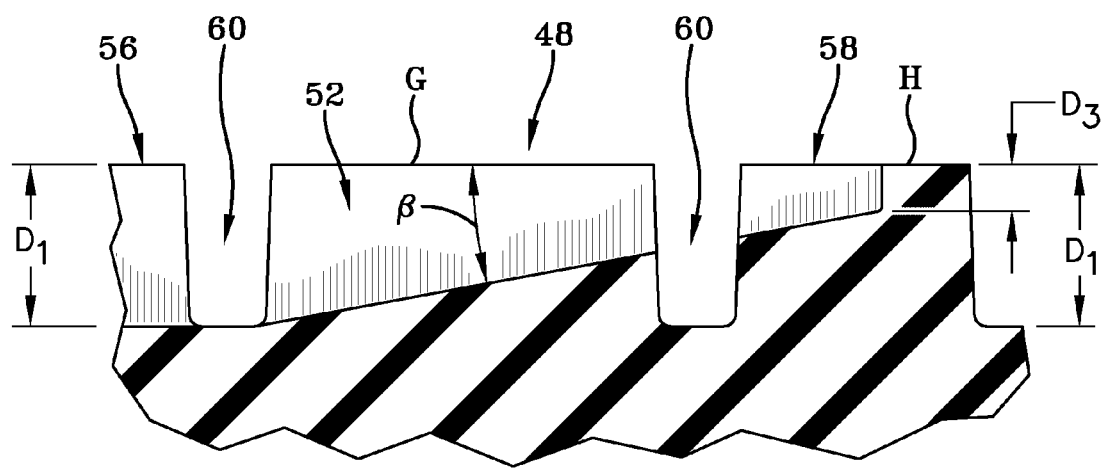
FIG. 11 is a partial section view through the tread center region taken along the line 11-11 of FIG. 8.

The repeating circumferential array of first V-shaped grooves positioned on the centerplane overlap the array of second V-shaped grooves in such a way that one first V-groove 48 is overlapped by about 6 to 9 second V-grooves 60. FIG. 8 illustrates the center tread region 14 broken into regions A-H for illustration purposes. FIG. 9 shows the first V-groove 48 arm configuration within region A of the center tread (FIG. 8), that being the vertex segment 54 of the arms 50, 52. It will be appreciated as shown that the first V-groove arms 50, 52 have a varying lengthwise depth that varies between about 2 and 7 millimeters from a shallower depth D3 at the vertex arm segment 54 to an increased depth D1 at the medial arm segment 56 back to a decreased depth D3 at the terminal arm segment 58. The shallow depth D3 at arm segments 54, 58 is approximately 2 millimeters. The groove 48 deepens at an angle $\beta$ of approximately 45 degrees through regions B, C of FIG. 8 to a maximum depth of 7 millimeters in the medial segment 56 of the groove arms represented by regions D, E in FIG. 8. From medial section 56, the groove arm depth inclines (regions F, G, H of FIG. 8) back to a depth D3 of 2 millimeters at the terminal arm end 58 as shown in FIG. 11.

In addition to the variable depth within the first V-grooves 48, the width of the first V-groove arms 50, 52 varies between the vertex segment 54, medial segment 56, and terminal segment 58. The arms 50, 52 of each V-groove 48 at the vertex and terminal ends is narrower, approximately 1 to 3 millimeters. In the medial segment 56, the groove arms 50, 52 widen to 3 to 8 millimeters or generally two times the minimum width at the ends.

Referring to FIGS. 3, 6, 7A, and 7B, the off center block elements 26 have along an upper edge 63 of the side 27 a series of saw-teeth 62 of generally right triangular sectional configuration. Each of the saw-teeth 62 are inclined along surface 64 at an angle $\alpha$ of approximately 45 degrees to intersect surface 66. Adjacent saw-teeth meet at intersection 68. On the opposite side of the grooves 22, 24, the shoulder lugs 38 likewise have a series of saw-teeth 76 that are directed into a respective groove. The shoulder lug saw-teeth 76 are inclined at angle α in an opposite radial direction as the saw-teeth 62. Saw-teeth 76 include inclined surface 78 which meets tooth side 80. Adjacent saw-teeth 76 meet at intersection 82. The inclination angle of teeth 62, 76 is approximately 45 degrees. The saw-teeth 62, 76 are approximately 2-3 mm in depth D2 and are spaced apart a distance W of approximately 5 millimeters. The saw-teeth 62, 76 are inclined in the radial direction with the inclination of teeth on one side of the groove being in the opposite radial direction than on the other side of the groove 22, 24. The opposite radial inclination of the saw-teeth on opposite sides of the grooves acts to increase grip on snow surfaces. The number of the saw-teeth is preferably the same as the number of the lateral, preferably wavy sipes in the respective tread block. The saw-teeth are preferably also aligned with respect aligned at intersections 68, 82 with respective wavy sipes extending across each block.

Figure 5B:
FIG. 5B is a section view through a sipe taken along the line 5B-5B of FIG. 5A.
Figure 5C:
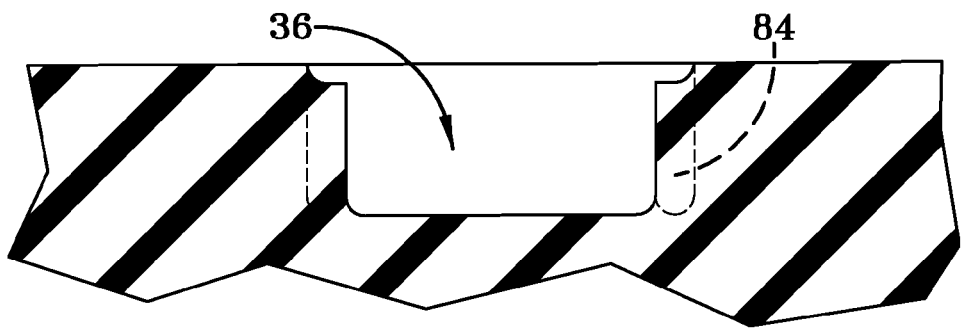
FIG. 5C is a section view through a notch taken along the line 5C-5C of FIG. 5A.
Figure 6:
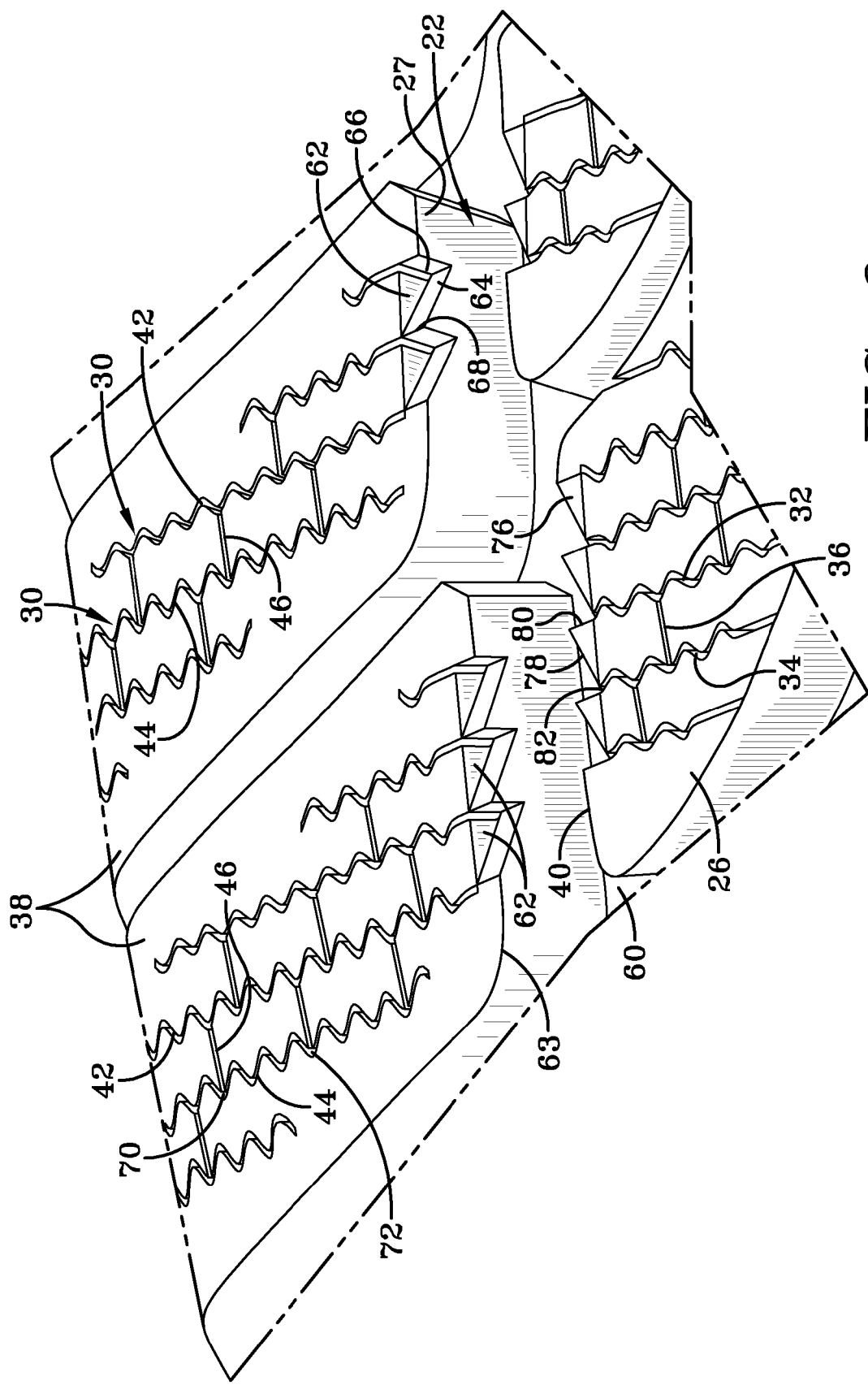
FIG. 6 is a partial perspective view of a tread portion taken along the line 6-6 of FIG. 3.
Figure 7A:
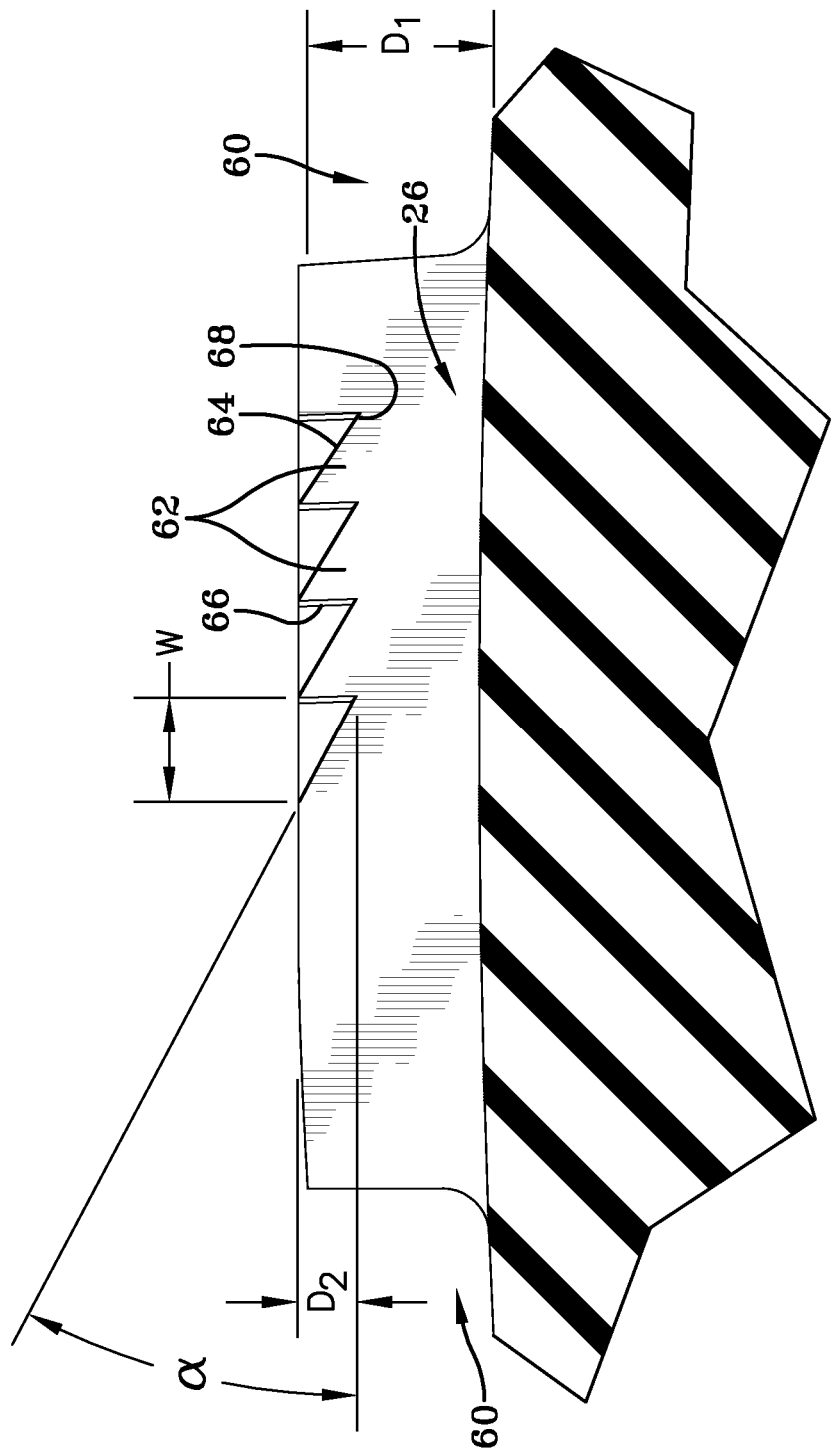
FIG. 7A is a partial section view of a tread portion taken along the line 7A-7A of FIG. 4.

With continued reference to FIGS. 3, 5A, 5B, 5C, 6, 7A, and 7B, adjacent wavy sipes in the center and shoulder tread blocks extend in a generally axial lateral direction and may be connected by one or more circumferential notches. The notches 36 (center tread region) and 46 (shoulder blocks) are generally rectangular in section and of a constant depth as shown by FIG. 5C. The wavy sipes 30 (center tread region blocks) and 42, 44 (shoulder blocks) have a sectional configuration shown in FIG. 5B. Straight circumferentially oriented notches 36, 46 interconnect adjacent axially oriented wavy sipes 30, 42, 44. Included in the sipe configuration are semi-circular shaped cuts or recesses 84. The recesses 84 are located such that the notches 36 interconnect a pair of adjacent wavy sipes at opposite notch ends 70, 72 at non-recessed sipe regions rather than at the recessed regions 84. In so doing, the notches meet the sipes at locations where there is no recess 84. The depth of the notch and the sipes intersected thereby is generally the same as shown by FIGS. 5B and 5C.

From the foregoing, it will be appreciated that the vehicle wheel tire includes a tire tread 12 having a circumferential center tread region 14 in which block elements (e.g. 26, 28) are arranged in a symmetric pattern on opposite sides of a tire circumferential equatorial centerplane 20. The advantage of a symmetrically configured tire tread to a user is to simplify orientation and positional issues in the mounting of the tire to a vehicle. The symmetrically disposed block elements on opposite sides of the centerplane have a plurality of spaced apart and laterally extending wavy sipes 30 extending across the block element. Selective pairs of adjacent sipes (e.g. 32, 34) are interconnected by one or more circumferentially oriented notches 36.

The opposite lateral sides of the center tread region 14 are bounded respectively by the circumferential grooves 22, 24; the grooves representing the sole grooves within respective halves of the tire tread. Moreover, the notches 36 within the tire tread are confined to the center tread region 14.

The notches 36 and 46 always link two adjacent and parallel preferably wavy sipes. In order not to weaken the tread or render the tread too soft, the notches meet the sipes in non-recessed regions of the sipes. The notches further improve tread performance in providing improved side-rip in winter conditions and better comfort at dry handling.

It will further be noted from the foregoing that the tread has improved traction characteristics achieved through bounding one or more circumferential grooves by saw-tooth edges of opposing block elements. Each opposed block element provides a block edge facing the groove with the array of saw-teeth formed along each block edge inclined in the radial direction. Preferably, the saw-teeth on a groove-facing block edge of a center tread region block element(s) incline in a direction opposite from the inclination of saw-teeth on a groove-facing edge of a block element on the opposite second side of the groove. Preferably, the sipes extend across the center tread region block element to the array of saw-teeth along the groove-facing edge of the block element. The number of sipes preferably although not necessarily equal the number of saw-teeth along the block edge and align with respective saw-teeth spacing along the block edge. The block elements on opposite adjacent sides of the groove have saw-teeth inclining in opposite directions for improved gripping or traction.

The repeating circumferential array of first V-shaped grooves positioned on the centerplane and the repeating circumferential array of oppositely oriented second V-shaped grooves provided improved traction and gripping. The first V-grooves have a varying lengthwise depth that varies between about 2 and 7 millimeters from a shallower depth proximate to the vertex arm region to an increased depth at the medial arm region to a decreased depth at the terminal arm region. The width of the first V-groove arms further is varied from the vertex to the terminal ends and the varying depth and width of the first V-shaped groove arms from the vertex region to the terminal region make the containment volume of the groove arms per length unit substantially constant in the medial arm region.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle wheel tire comprising:
  a tire tread having a circumferential center tread region comprising a plurality of block elements arranged in a pattern on opposite sides of a tire circumferential equatorial centerplane, wherein the tread having a repeating circumferential array of first substantially V-shaped grooves positioned on the centerplane, each first V-shaped groove having divergent first groove side arms extending in a first circumferential direction, and the tread having a repeating circumferential array of second substantially V-shaped grooves positioned on the centerplane and having divergent second groove side arms extending in a second circumferential direction opposite to the first circumferential direction;
  each first V-shaped groove being overlapped by a plurality of second V-shaped grooves;
  wherein the first V-shaped groove arms each have a varying lengthwise depth; and
  wherein the groove depth of each first V-shaped groove varies from a shallower depth proximate to a vertex arm region to an increased depth at a medial arm region to a decreased depth at a terminal arm region.

2. The tire of claim 1, wherein the second V-shaped grooves are of a substantially constant depth.

3. The tire of claim 1, wherein the groove depth of the first V-shaped grooves varies between about 2 and 7 millimeters.

4. The tire of claim 1, wherein the groove depth of the first V-shaped grooves at the vertex and terminal arm regions is substantially 2 millimeters and at the medial arm region substantially 7 millimeters.

5. The tire of claim 1, wherein the first V-shaped groove arms each vary in width from a narrower vertex arm region to a wider medial arm region.

6. The tire of claim 5, wherein the volume of each first V-shaped groove arm per length unit is substantially constant in the medial arm region.

7. The tire of claim 6, wherein the first V-shaped groove arms each vary in width from the medial arm region to a terminal arm region.

8. The tire of claim 7, wherein the volume of the first V-shaped groove arms per length unit is substantially constant from the vertex arm region to the terminal arm region.

9. The tire of claim 1, wherein the first V-shaped groove arms vary in width from a narrower vertex arm region to a wider medial arm region, the wider medial arm region and have a width at the medial arm region at least two times the width of the narrower vertex arm region.

10. The tire of claim 9, wherein the volume of the groove arms per length unit is substantially constant in the medial arm region.

11. The tire of claim 1, wherein the first V-shaped grooves are each overlapped by about 6 to 9 second V-shaped grooves.

12. A vehicle wheel tire comprising:
a tire tread having a circumferential center tread region comprising a plurality of block elements arranged in a pattern on opposite sides of a tire circumferential equatorial centerplane, wherein the tread having a repeating circumferential array of first substantially V-shaped grooves positioned on the centerplane, each first V-shaped groove having divergent first groove sidearms, each sidearm extending from a first groove vertex arm region in a first circumferential direction, and the tread having a repeating circumferential array of second substantially V-shaped grooves positioned on the centerplane, second V-shaped groove having divergent second groove arms extending from a second groove vertex in a second circumferential direction opposite to the first circumferential direction;

each first V-shaped groove being overlapped by a plurality of second V-shaped grooves; and each first V-shaped groove having a variable lengthwise depth and width between the first V-shaped groove vertex arm region and a first V-shaped groove terminal arm region; and wherein the groove depth of each first V-shaped groove varies from a shallower depth proximate to a vertex arm region to an increased depth at a medial arm region to a decreased depth at a terminal arm region.

13. A tire according to claim 12, wherein each first V-shaped groove arms is of substantially constant lengthwise volume per unit length from the vertex arm region to the terminal arm region.

14. A tire according to claim 13, wherein each first V-shaped groove arms has a varying lengthwise depth and width between the medial arm region and a terminal arm region, and wherein each first V-shaped groove arm is of substantially constant lengthwise volume per unit length from the vertex arm region to the terminal arm region.

15. A tire according to claim 12, wherein each first V-shaped groove arm has a wide medial arm region at least two times the width of a narrower vertex arm region.

16. A tire according to claim 15, wherein each first V-shaped groove arms is of substantially constant lengthwise volume per unit length from the vertex arm region to the terminal arm region.

* * * * *